(12) United States Patent  
Krampotich et al.

(10) Patent No.: US 7,715,681 B2
(45) Date of Patent: May 11, 2010

(54) REAR LATCH ARRANGEMENT FOR SLIDING DRAWER

(75) Inventors: Dennis Krampotich, Shakopee, MN (US); Ryan Kostecka, Burnsville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/381,159

(22) Filed: Mar. 6, 2009

(65) Prior Publication Data

US 2009/0245745 A1    Oct. 1, 2009

Related U.S. Application Data

(60) Provisional application No. 61/072,148, filed on Mar. 28, 2008.

(51) Int. Cl.
G02B 6/00 (2006.01)
G02B 6/36 (2006.01)

(52) U.S. Cl. .................. 385/135; 385/53; 385/134; 385/136; 385/137; 385/138; 385/139

(58) Field of Classification Search ............ 385/53, 385/65, 75, 134–139
See application file for complete search history.

(56) References Cited

U.S. PATENT DOCUMENTS

| 2,486,764 | A | 11/1949 | Singer |
| 2,517,175 | A | 8/1950 | Bremer |
| 2,630,364 | A | 3/1953 | Gleason |
| 2,789,024 | A | 4/1957 | Heisler |
| 3,589,783 | A | 6/1971 | Studinski |
| 3,651,986 | A | 3/1972 | Karecki et al. |
| 3,782,800 | A * | 1/1974 | Remington et al. ......... 312/333 |
| 5,141,266 | A | 8/1992 | Braun et al. |
| 5,723,850 | A * | 3/1998 | Lambert .................. 235/22 |
| 5,802,892 | A | 9/1998 | Cohn et al. |
| 6,435,587 | B1 | 8/2002 | Flowerday et al. |
| 6,438,310 | B1 | 8/2002 | Lance et al. |
| 6,504,988 | B1 | 1/2003 | Trebesch et al. |
| 7,079,744 | B2 | 7/2006 | Douglas et al. |
| 7,171,099 | B2 | 1/2007 | Barnes et al. |
| 7,567,744 | B2 * | 7/2009 | Krampotich et al. ........ 385/135 |
| 2002/0124779 | A1 | 9/2002 | Perkins |
| 2005/0025444 | A1 | 2/2005 | Barnes et al. |
| 2007/0031099 | A1 | 2/2007 | Herzog et al. |
| 2008/0085092 | A1 | 4/2008 | Barnes |
| 2008/0304803 | A1 | 12/2008 | Krampotich et al. |

* cited by examiner

*Primary Examiner*—Brian M. Healy
*Assistant Examiner*—Hung Lam
(74) *Attorney, Agent, or Firm*—Merchant & Gould P.C.

(57) ABSTRACT

A cable management panel including a chassis, a drawer, and a rear latch arrangement. The rear latch arrangement including a latch having a free tab end. The free tab end engaging the front edge of a top wall of the chassis to prevent inadvertent closing movement of the drawer relative to the chassis.

20 Claims, 6 Drawing Sheets

REAR LATCH ARRANGEMENT FOR SLIDING DRAWER

CROSS-REFERENCE TO RELATED APPLICATIONS

This application claims the benefit of U.S. Provisional Application Ser. No. 61/072,148, filed Mar. 28, 2008; which application is incorporated herein by reference.

TECHNICAL FIELD

This disclosure relates generally to methods and devices for management of telecommunication cables. More particularly, this disclosure relates to a cable management panel having a drawer for managing fiber optic cables.

BACKGROUND

Cable management arrangements for cable termination, splice, and storage come in many forms. One cable management arrangement used in the telecommunications industry today includes sliding drawers installed on telecommunication equipment racks. The drawers organize and manage high-density cable terminations, cable splicing, and cable storage.

As can be understood, access to the interior of drawers is needed for purposes of cable and component installation, repair, and maintenance. Often times during such procedures, the drawers can inadvertently close or move rearward causing damage to unsecured cables and/or components. There is a continued need in the art for providing drawer arrangements that accommodate and ease the procedures associated with accessing the drawer interior during such installation, repair, and maintenance.

SUMMARY

One aspect of the present invention relates to a cable management panel having a chassis, a sliding drawer, and a rear latch arrangement. The rear latch arrangement includes a latch having a free tab end. The free tab end engages a top wall of the chassis to prevent inadvertent closing movement of the drawer relative to the chassis.

A variety of examples of desirable product features or methods are set forth in part in the description that follows, and in part will be apparent from the description, or may be learned by practicing various aspects of the disclosure. The aspects of the disclosure may relate to individual features as well as combinations of features, including combinations of features disclosed in separate embodiments. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 1:
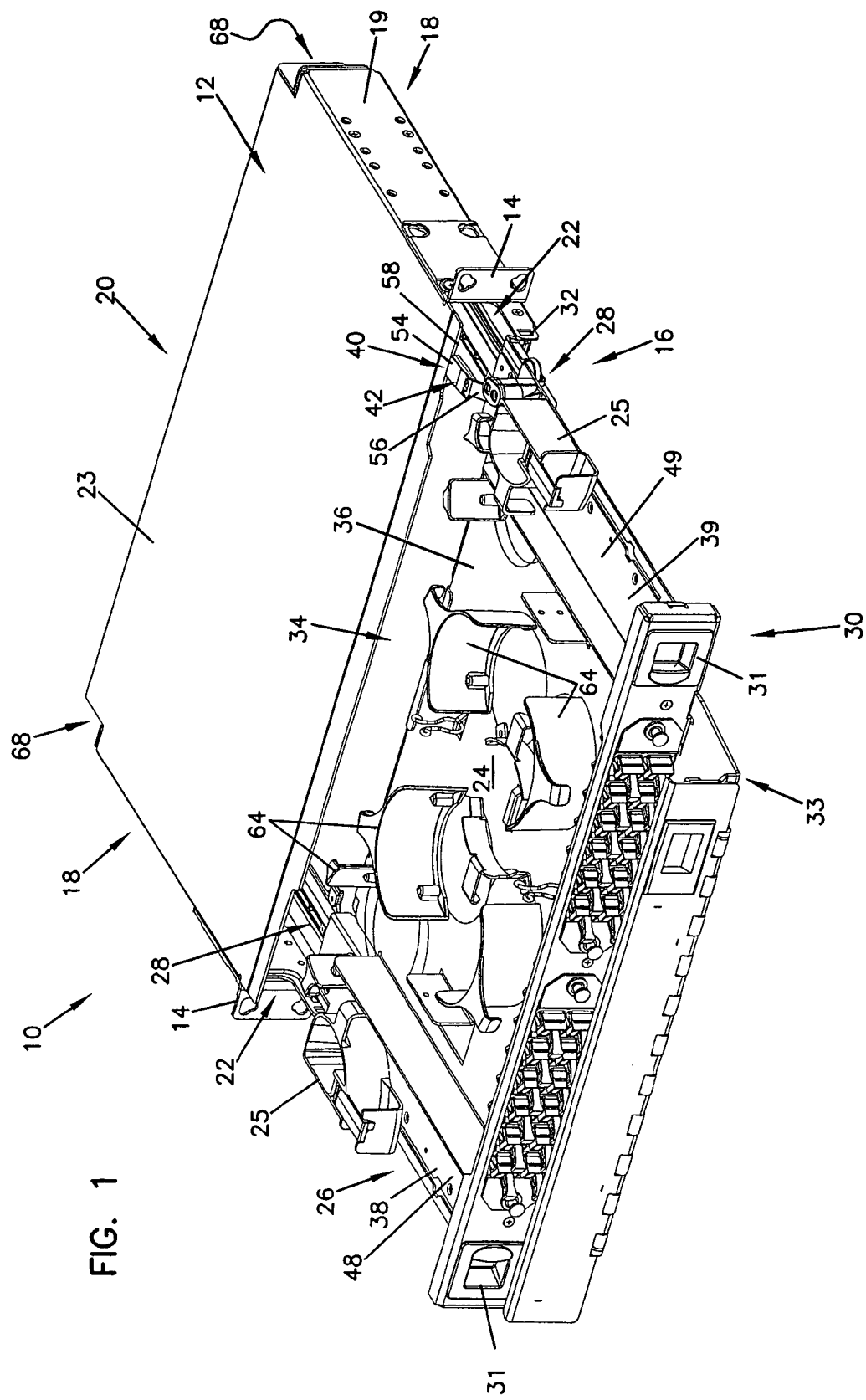
FIG. 1 is a front perspective view of one embodiment of a cable management panel according to the principles of the present disclosure.

Referring to FIG. 1, one embodiment of a cable management module or panel 10 according to the present invention is illustrated. The cable management panel 10 includes a frame or chassis 12 having mounting brackets 14. Further details of an example mounting bracket arrangement that can be used in accordance with the principles disclosed is described in U.S. Publication No. 2005/0025444, the disclosure of which is hereby incorporated by reference. The mounting brackets 14 are used to mount the panel 10 to a telecommunication structure, such as a telecommunications rack, cabinet or other enclosure or framework.

Referring still to FIG. 1, the chassis 12 of the cable management panel 10 has a front 16, opposite sides 18, and a rear 20. The sides 18 include sidewalls 19 each having cable access openings 22 for cables entering or exiting the chassis 12. A top wall 23 of the chassis extends between the sidewalls 19 of the chassis 12.

The cable management panel 10 further includes a drawer 26 having an interior region 24. The drawer 26 slides relative to the chassis 12 by way of a drawer slide assembly 28 located at each side 18 of the chassis 12. Further details of slide assemblies that can be used in the present cable management panel are described in U.S. Pat. No. 7,171,099 and U.S. application Ser. No. 11/543,457; which disclosures are incorporated herein by reference. In a closed position, the contents of the interior region 24 of the drawer 26 are enclosed and protected. In an opened position, the interior region 24 can be accessed for cable or component installation, maintenance, or repair.

The drawer 26 of the cable management panel 10 has a front 33, a rear 34, a base 36, and sides 38, 39. In the illustrated embodiment, the rear 34 of the drawer 26 is open. Likewise, the sides 38, 39 of the drawer 26 are open. The open rear and open sides allow for cable entry into and cable exit from the interior region 24 of the drawer 26. Radius limiters 25 are provided at the open sides 38, 39 of the drawer for managing the exiting and entering cables the sides during sliding movement of the drawer 26. The radius limiters 25 also protect the cables from damage by limiting cable bending beyond a minimum bend radius. Further details of example radius limiters and radius limiter assemblies that can be used in the present cable management panel are described in U.S. Pat. Nos. 6,438,310; 6,504,988; and 7,079,744; the disclosures of which are each incorporated herein by reference.

The cable management panel 10 can contain a variety of cable management elements. The cable management elements can be mounted to the base 36 of the drawer 26, or mounted on a tray or insert that drops into the interior region 24 of the drawer. Further details of an example drop-in tray that can be used in the present cable management panel 10 are described in U.S. Publication No. 2007/0031099; which is incorporated herein by reference.

The variety of cable management elements that the cable management panel 10 may contain include cable retainers (e.g., 64), splice trays (e.g., 66, FIG. 4), and adapter or connector holders to which fiber optic cables are terminated. Examples of other cable management elements include other constructions, assemblies, and devices for storing cables or connecting the cables to other cables; and/or other fiber optic devices, such as attenuators, couplers, switches, wave division multiplexers (WDMs), and splitters/combiners. The U.S. patents and applications previously incorporated herein by reference describe examples of cable management elements and arrangements that can be provided within the interior region 24 of the drawer 26. As can be understood, the drawer 26 can be customized to include numerous forms of cable management elements to accommodate the particular needs of the user.

Referring still to FIG. 1, the present cable management panel 10 includes a front latch arrangement 30 and a rear latch arrangement 40 (e.g., locking arrangements). The front latch or locking arrangement 30 includes a front latch 31 located at the front 33 of the drawer adjacent to each one of the sides 38, 39 of the drawer 26. In the closed position, each latch 31 engages a side hole 32 located at the side 18 of the chassis 12 to secure the drawer 26 in the closed position.

Figure 2:
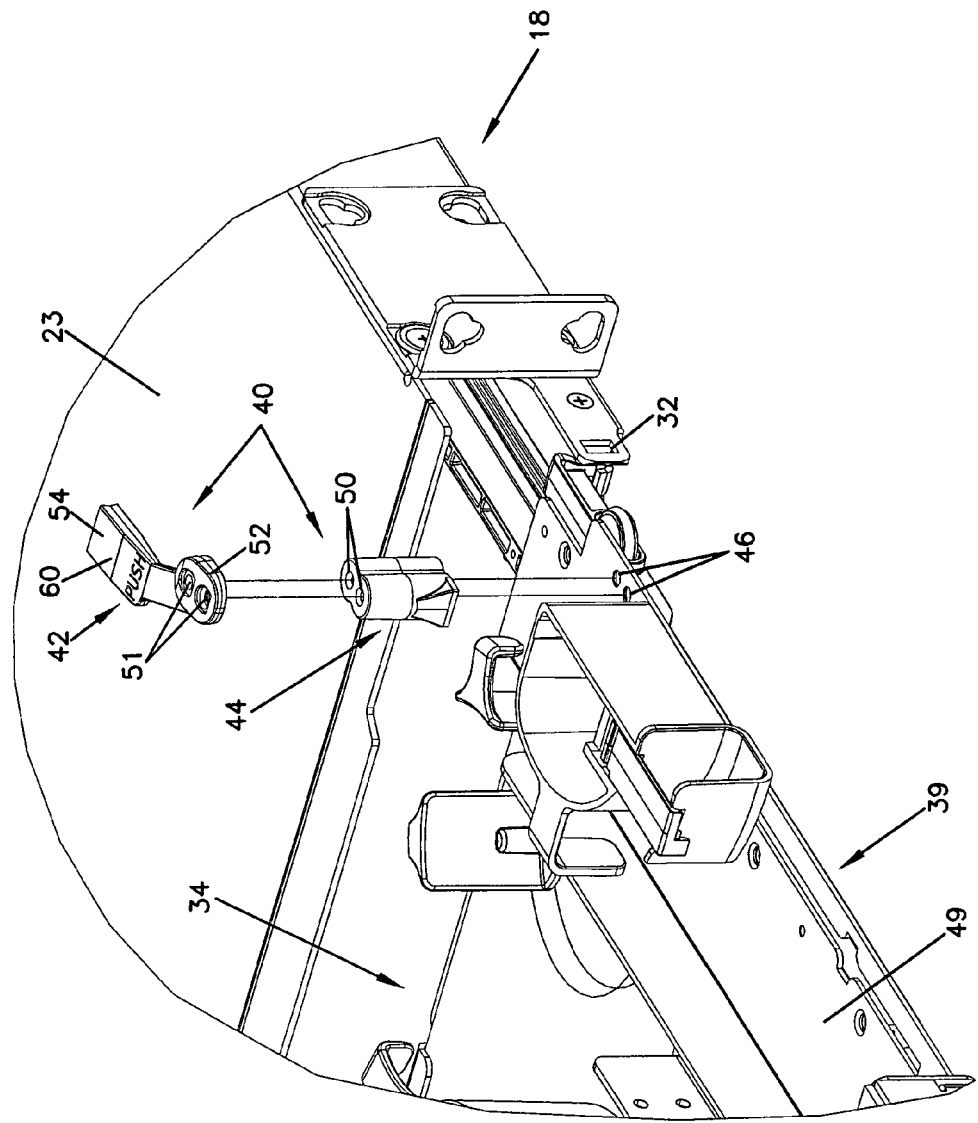
FIG. 2 is an enlarged view of a portion of the cable management panel of FIG. 1, illustrating an embodiment of a rear latch arrangement in a partially exploded view.

Referring now to FIG. 2, the rear latch or locking arrangement 40 is located at the rear 34 of the drawer 26 on one of the sides 38, 39 of the drawer. While the illustrated embodiment depicts the drawer having only a single rear latch arrangement, rear latch arrangements can be provided at each of the sides of the drawer.

The rear latch arrangement 40 is designed to prevent inadvertent closing movement of the drawer 26 relative to the chassis 12. What is meant by closing movement is movement of the drawer in a rearward direction from the open position toward the closed position. It is noted that the drawer 26 can move beyond the open position to an extended open position in a forward direction. The user may move the drawer rearward from the extended open position to the open position; this rearward movement is not the closing movement that the rear latch arrangement prevents. Rather, the closing movement is movement of the drawer in a rearward direction from the open position toward the closed position, which can cause damage to cables and components when such movement inadvertently occurs during installation, repairs or maintenance.

In particular, during installation, repair or maintenance procedures, the user or technician, for example, routes cables into and out from the drawer, and/or internally routes cables to and from components contained within the drawer. Often times, the cables or components are pulled or pushed, forcing the drawer in a rearward direction. Closing movement of the drawer in the rearward direction can cause damage to cables and/or components not yet completely routed or secured. The presently disclosed rear latch arrangement 40 prevents the drawer 26 from closing and eliminates the occurrence of cable damage and/or component damage due to inadvertent closing movement.

Referring still to FIG. 2, the rear latch arrangement 40 generally includes a rear latch 42 and a mounting block 44. The mounting block 44 is mounted on one of the open sides (e.g., 39) of the drawer 26. The open sides 38, 39 of the drawer 26 are defined by generally horizontal plates 48, 49. Each plate 48, 49 has mounting holes 46 that correspond to through holes 50 formed in the mounting block 44, which in turn correspond to through holes 51 formed in the rear latch 42. Fasteners (not shown) secure the rear latch 42 to the block 44 and to the open side of the drawer 26.

Figure 3:
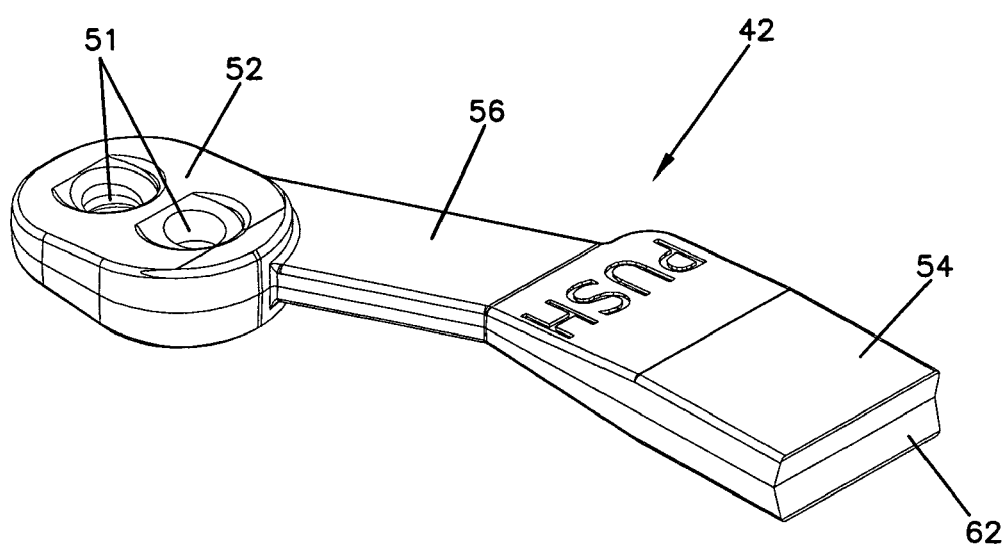
FIG. 3 is a perspective view of a latch of the rear latch arrangement of FIG. 2, shown in isolation.

Referring now to FIGS. 2 and 3, the rear latch 42 has a mounting tab end 52 and an opposite free tab end 54. The mounting tab end 52 and the free tab end 54 are interconnected by a flexible arm 56. The mounting tab end 52 is mounted to the mounting block 44; that is, the mounting tab end defines the through holes 51 that receive the fasteners to secure the rear latch 42 relative to the mounting block 44 and to the drawer 26. When the rear latch arrangement 40 is mounted to the drawer, the rear latch 42 extends generally rearward; i.e., the free tab end 54 of the rear latch 42 is located rearward of the mounting tab end 52. In the illustrated embodiment, the free tab end 54 is offset from the mounting tab end 52 by the flexible arm 56. The offset configuration provides for clearance of notches 68 (FIG. 1) located at the rear 20 of the chassis when the drawer is in the closed position.

Figure 4:
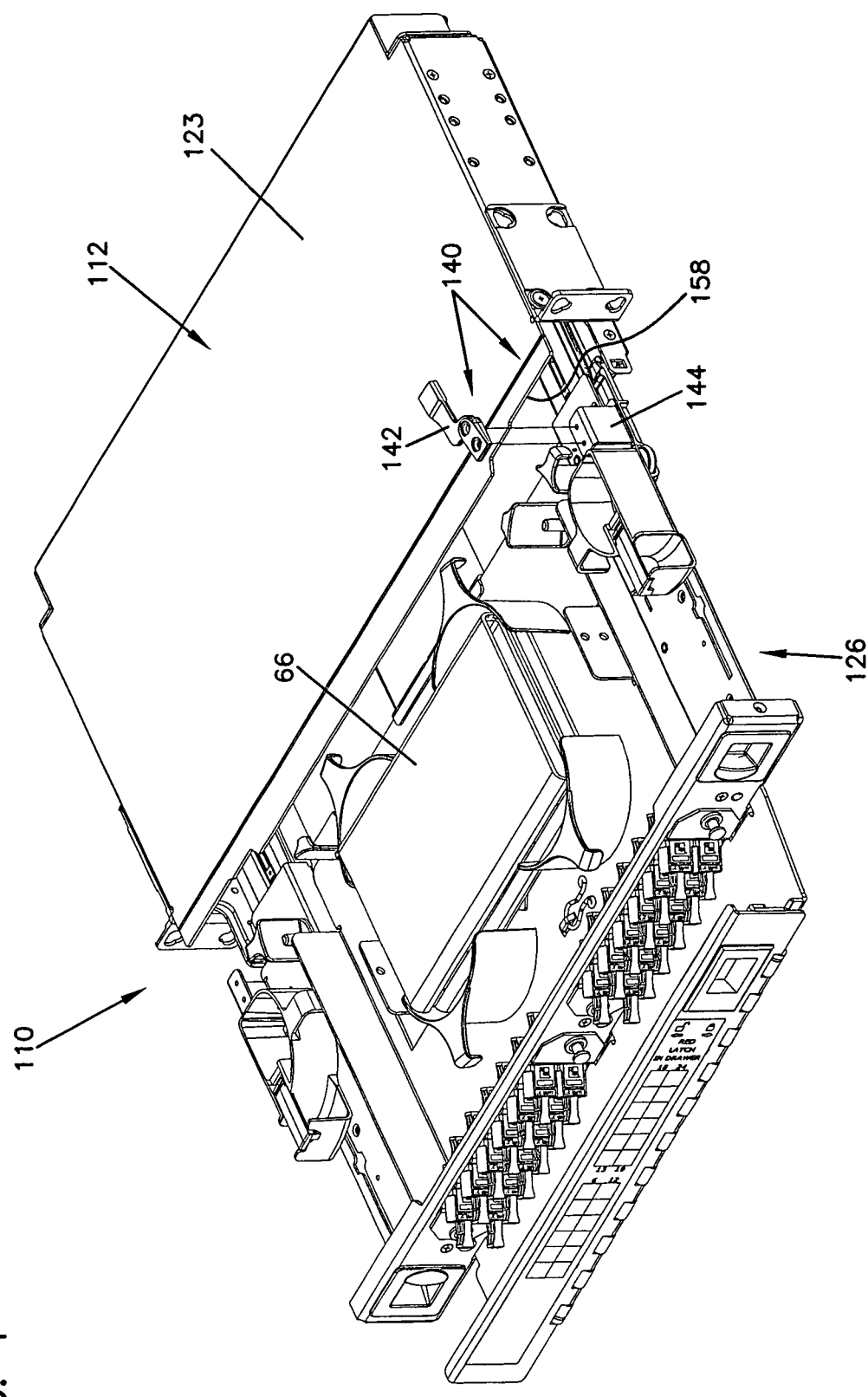
FIG. 4 is a front perspective view of another embodiment of a cable management panel according to the principles of the present disclosure.
Figure 5:
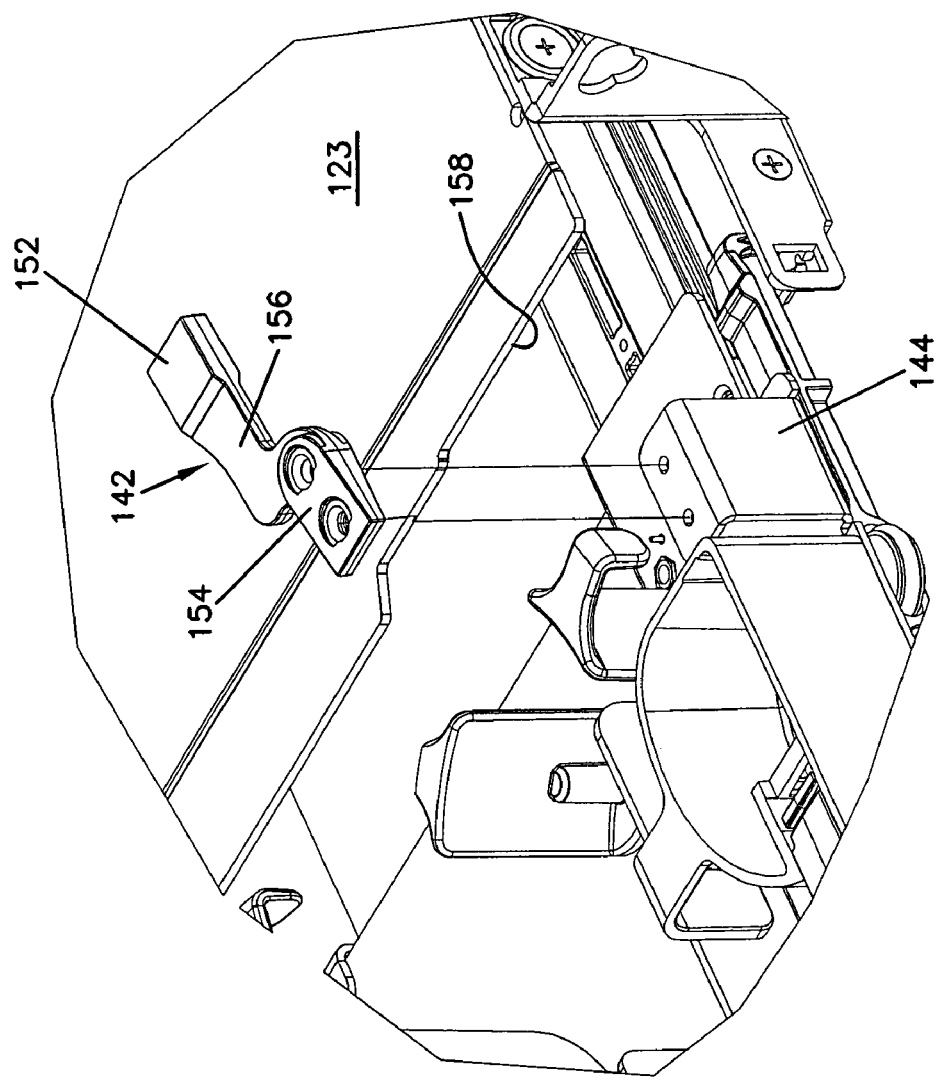
FIG. 5 is an enlarged view of a portion of the cable management panel of FIG. 4, illustrating another embodiment of a rear latch arrangement in a partially exploded view.
Figure 6:
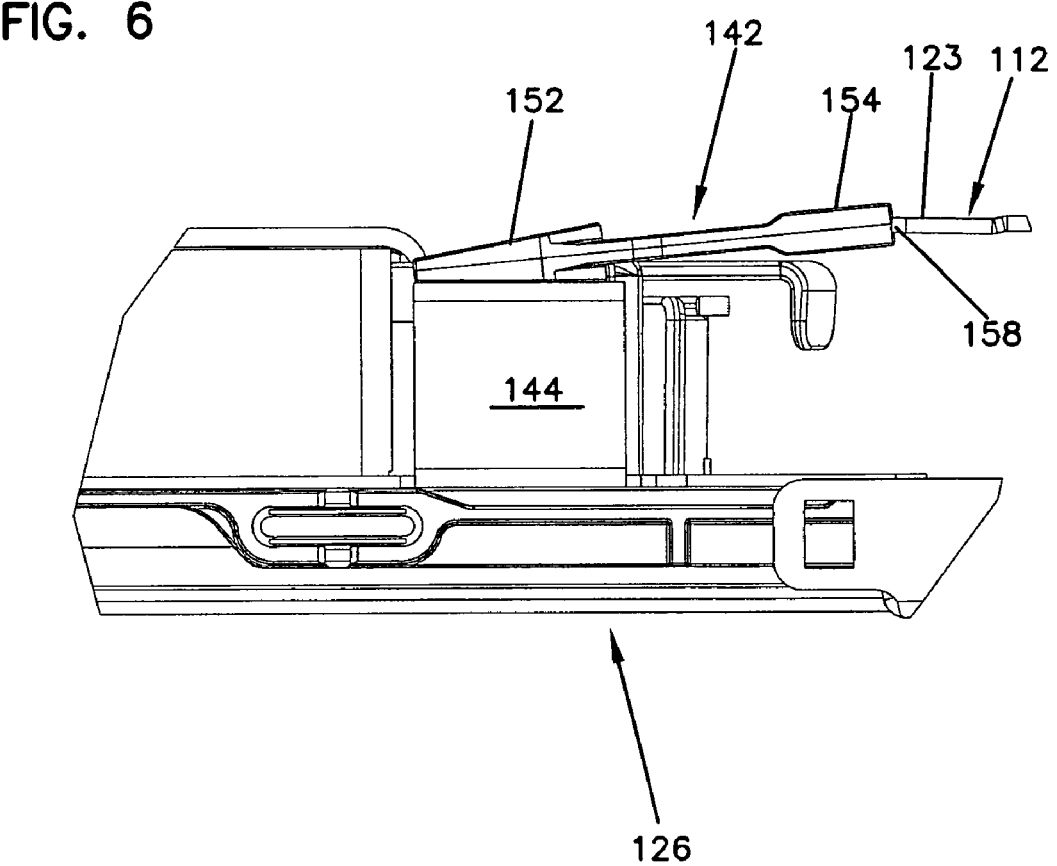
FIG. 6 is a side elevation view of the rear latch arrangement of the cable management panel of FIG. 5, illustrating the rear latch arrangement in a non-exploded view.

Referring now to FIGS. 4-6, another cable management panel 110 having a second embodiment of a rear latch arrangement 140 is illustrated. The cable management panel 110 includes a chassis 112 and a sliding drawer 126. Similar to the first embodiment of the rear latch arrangement, the second rear latch arrangement 140 generally includes a rear latch 142 (FIG. 5) and a mounting block 144. The rear latch 142 has a mounting tab end 152 and a free tab end 154 interconnected by a flexible arm 156. The rear latch 142 mounts to the mounting block 144, which in turn mounts to one of the sides of the drawer 126. With the exception of the general shape configurations of the block 144 and the latch 142, the second rear latch arrangement of FIGS. 4-6 functions in the same manner as the first embodiment. Accordingly, the remainder of the present disclosure generally refers only to the first embodiment but applies as well to the second embodiment.

Referring back to FIGS. 1-3, as can be understood, when the drawer is in the closed position, the free tab end 54 of the rear latch 42 is positioned underneath the top wall 23 of the chassis 12. In particular, the free tab end 54 is biased in a direction toward the base 36 of the drawer by the top wall 23 (i.e., biased downward toward the horizontal plate 49 of the drawer). The flexible arm 56 of the rear latch facilitates this downward bias or flexure. As the drawer 26 slides from the closed position to the open position, the free tab end 54 slides along the interior surface of the top wall 23 of the chassis 12.

Referring to FIG. 1, when the drawer reaches the open position, the flexible arm 56 of the rear latch 42 returns to an unbiased or normal state to automatically lock the drawer 26 in the open position. What is meant by "automatically" is that the rear latch 42 moves from an unlocking position (i.e., the position at which the free tab end 54 is located under the top wall 23 of the chassis) to a locking position without a technician having to manually move or manipulate the rear latch arrangement 40. In particular, the free tab end 54 snaps into the locking position for engagement with a front edge 58 of the top wall 23 of the chassis. In this locking position, the free tab end 54 engages the front edge 58 of the top wall 23 to prevent inadvertent closing movement of the drawer 26. (See also FIG. 6 illustrating the free tab end 154 of rear latch 142 engaging front edge 158 of the top wall 123.)

Referring back to FIG. 1, the rear latch arrangement, including the mounting block 44 and the rear latch 42, selectively mounts to both of either one of the sides 38, 39 of the drawer 26. What is meant by "selectively mounts" is that the rear latch arrangement is constructed to operably mount at whichever drawer side the user desires; e.g., the rear latch arrangement 40 operably mounts at one side 38 of the drawer, and operably mounts at the other side 39 of the drawer. In either configuration (left-side mount or right-side mount), the rear latch arrangement functions in the same manner such that inadvertent closing movement is prevented.

The selective mounting feature of the rear latch arrangement 40 is provided in part by the symmetrical construction of the mounting block 44 (FIG. 2). The symmetrical construction permits the mounting block to mount at the mounting holes 46 provided at the right side 39 of the drawer or at mounting holes (not shown) provided at the left side 38 of the drawer. When that rear latch arrangement is mounted at the right side 39 of the drawer 26, a first side 60 of the rear latch faces upward toward the top wall 23 of the chassis. When the rear latch arrangement 40 is mounted at the left side 38 of the drawer 26, the first side 60 of the rear latch faces downward toward the horizontal plate 48 of the drawer.

Referring again to FIG. 3, in this illustrated embodiment, the free tab end 54 of the rear latch 42 defines a notched edge 62 (e.g., a groove or inverted chamfer formed in the engaging edge of the end 54). The notched edge 62 centers and/or captures the front edge 58 of the top wall 23 of the chassis 12 to ensure engagement that prevents the inadvertent closing movement.

In use, such as during maintenance of the drawer, the user slides the drawer 26 out from the chassis 12 toward the open position. As the drawer slides out, the biased rear latch 42 slides along the interior side of the top wall 23 of the chassis 12. When the drawer reaches the open position, the rear latch 42 is released from beneath the top wall 23 and snaps into position for engagement with the front edge 58 of the top wall. With the drawer locked in the open position, the user can access the interior region 24 of the drawer 26 without concern of inadvertent closing movement that can cause damage to cables and components.

To unlock and close the drawer, the user flexes the free tab end 54 of the rear latch 42 under the top wall 23 of the chassis and slides the drawer 26 to the closed position. In the first rear latch arrangement of FIGS. 1-3, the front edge 58 of the top wall 23 may be centered and/or captured within the notched edge 62 of the free tab end 54. The user can simply pull the drawer 26 further forward of the open position (i.e., to the extended open position) and release the front edge 58 of the top wall 23. The rear latch 42 can then be flexed under the top wall of the chassis and the drawer closed.

In some conventional arrangements, the physical locking engagement of a locking device is hidden from view. Because of the number of components on a drawer, it is not always easy to determine the location of the locking device. As shown in FIG. 1, the engagement between the free tab end 54 of the rear latch 42 and the top wall 23 of the chassis 12 is visible to the user. The user therefore can readily determine what mechanism is preventing the closing movement of the drawer, and can accordingly more quickly determine how to unlock the drawer.

The above specification provides a complete description of the invention. Since many embodiments of the invention can be made without departing from the spirit and scope of the invention, certain aspects of the invention reside in the claims hereinafter appended.

What is claimed is:

1. A cable management panel, comprising:
 a) a chassis having a top wall that extends between opposite side walls;
 b) a drawer mounted to the chassis, the drawer being configured to slide between an open position and a closed position relative to the chassis, the drawer having a front, a rear, and opposite sides; and
 c) a locking arrangement that prevents inadvertent closing movement of the drawer relative to the chassis, the locking arrangement including a rear latch located at one of the sides of the drawer, the rear latch having a free tab end that engages a front edge of the top wall of the chassis when the drawer reaches the open position.

2. The panel of claim 1, wherein the free tab end of the rear latch is biased toward the base of the drawer by the top wall when the drawer is in the closed position.

3. The panel of claim 1, wherein the free tab end of the rear latch snaps into position for engagement with the front edge of the top wall when the drawer reaches the open position.

4. The panel of claim 1, wherein the locking arrangement includes a mounting block mounted on the one side of the drawer, the rear latch being mounted to the mounting block.

5. The panel of claim 4, wherein the rear latch has a mounting tab end opposite the free tab end, the mounting tab end being secured to the mounting block, the rear latch further including a flexible arm extending between the mounting tab end and the free tab end.

6. The panel of claim 5, wherein the free tab end is located rearward of the mounting tab end, relative to the front and rear of the drawer.

7. The panel of claim 5, wherein the free tab end is offset from the mounting tab end by the flexible arm.

8. The panel of claim 4, wherein the locking arrangement, including the mounting block and the rear latch, selectively mounts to the one side of the drawer and can also selectively mount to the other side of the drawer.

9. The panel of claim 8, wherein the mounting block is symmetrically constructed.

10. The panel of claim 9, wherein the latch is mounted with a first side up when mounted to the drawer at the one side, and is mounted with the first side down when mounted to the drawer at the other side.

11. The panel of claim 1, wherein the free tab end of the rear latch defines a notched edge that captures the edge of the top wall of the chassis.

12. The panel of claim 1, wherein the engagement between the free tab end of the rear latch and the top wall of the chassis is visible to the user when the drawer is locked in the open position.

13. A method of locking and unlocking a cable management panel, the method comprising the steps of:
 a) providing a drawer mounted to a chassis, the drawer including a locking arrangement that prevents inadvertent closing movement of the drawer;
 b) sliding the drawer from a closed position toward an open position relative to the chassis;
 c) locking the drawer in the open position wherein a rear latch of the locking arrangement engages a front edge of a top wall of the chassis to prevent the inadvertent closing movement of the drawer;
 d) accessing an interior region of the drawer;
 e) flexing a free tab end of the rear latch under the top wall of the chassis; and
 f) sliding the drawer from the open position to the closed position.

14. The method of claim 13, wherein the step of locking the drawer in the open position includes releasing the free tab end of the rear latch from beneath the top wall during sliding opening movement of the drawer, the rear latch snapping into position for engagement with the front edge of the top wall upon reaching the open position.

15. The method of claim 13, wherein the step of locking the drawer in the open position includes capturing the front edge of the top wall of the chassis within a notched edge of the free tab end of the rear latch.

16. The method of claim 15, further including centering the front edge of the top wall of the chassis within the notched edge of the free tab end of the rear latch.

17. The method of claim 15, further including pulling the drawer forward of the open position so that the rear latch releases the front edge of the top wall of the chassis before flexing the free tab end of the rear latch under the top wall.

18. A method of assembling a cable management panel, the method comprising the steps of:
   a) providing a drawer slidably mounted to a chassis; and
   b) selectively mounting a locking arrangement at one of a first side and a second side of the drawer, including positioning a free tab end of a rear latch relative to a front edge of a top wall of the chassis such that the free tab end engages the front edge to prevent inadvertent closing movement of the drawer during use of the cable management panel.

19. The method of claim 18, further including flexing the free tab end of the rear latch under the top wall of the chassis and sliding the drawer from an open position to a closed position.

20. The method of claim 18, wherein the step of selectively mounting the locking arrangement at the one side of the drawer includes mounting the locking arrangement so that the engagement between the free tab end of the rear latch and the top wall of the chassis is visible to the user when the drawer is locked in the open position.

* * * * *